PROTECTED CODE SIGNALING SYSTEM WITH DISCRETE ACKNOWLEDGMENT

Filed Dec. 22, 1967 5 Sheets-Sheet 1

INVENTORS R. H. BIDLACK
W. J. McKELVEY
BY R C [signature]
ATTORNEY

Nov. 17, 1970 R. H. BIDLACK ET AL 3,541,523

PROTECTED CODE SIGNALING SYSTEM WITH DISCRETE ACKNOWLEDGMENT

Filed Dec. 22, 1967 5 Sheets-Sheet 2

United States Patent Office 3,541,523
Patented Nov. 17, 1970

3,541,523

PROTECTED CODE SIGNALING SYSTEM WITH DISCRETE ACKNOWLEDGMENT

Richard H. Bidlack, Boonton, and William J. McKelvey, Middletown, N.J., assignors to Bell Telephone Laboratories, Incorporated, Murray Hill and Berkeley Heights, N.J., a corporation of New York Filed Dec. 22, 1967, Ser. No. 692,744
Int. Cl. H04l 11/06
U.S. Cl. 340—172.5 5 Claims

ABSTRACT OF THE DISCLOSURE

Two stations on a half-duplex line are arranged to alternately send action data words designating instructions, commands or telemetering signals. Each action data word is acknowledged by the destination station with a discrete answerback. The action data words and the discrete acknowledgments are stored in a common memory and read out during the station's communication interval to a parity generator, whereby all stored words, action and answerback, are protected and transmitted during the same. communication interval. Action data words are rescanned and therefore retransmitted until the corresponding acknowledgment is received from the other station.

FIELD OF THE INVENTION

This invention relates to a protected selective signaling system and, more particularly, to a transmission system wherein action data words designating instructions, commands, or telemeter signals, are transmitted by a station to a remote station which acknowledges, by answerback, the reception of the action data words.

DESCRIPTION OF THE PRIOR ART

The transmission of instructions or commands (such as commands to energize particular indicating devices, to open or close remote valves and switches, etc.) is readily provided by utilizing selective signaling systems which communicate with data words. Similarly, telemeter systems signaling the readings of meters, operation of alarms, etc., may also communicate with data words. Each instruction, command, data reading, etc., is obtained in the form of a mechanical operation such as a closure of a key, contact pair, or signal switch. These closures in turn are translatable to electrical signals. These signals are then preferably applied to a store or memory in the selective signaling system. The memory is thereafter scanned and a data word designating each stored action (command, instruction, data reading, etc.) is transmitted. Scanning and transmitting stored data in selective signaling systems are necessary where half-duplex (one-way) signaling or multiple station lines are employed since each transmitting station is allocated only a limited discrete transmission interval to send all the data it may accumulate.

It is preferable that the transmitting station is assured that each data word designating an action (hereinafter referred to as an action word or code) is received by the remote destination station. To provide this assurance, the remote station acknowledges the reception of the action code, with an answerback response. This response may be by a discrete acknowledgment data word which selectively indicates the reception of the particular action code. Systems which provide answerback to assure correct transmission and reception of action codes are called protected systems.

Any station may be required to both send and receive action codes. The station must, therefore, include a store, a scanner, a transmitter for the action designations scanned in the store, a receiver and translator for incoming action words and a generator for the acknowledgment codes. Moreover, the originating station preferably is arranged to resend any action word if the previous transmission is not acknowledged. Stations, therefore, tend to be complex and expensive. In addition, where the station can send only during a discrete interval, the transmission of new action data is generally delayed until the necessary acknowledgments are returned for the previously transmitted data.

Accordingly, it is an object of this invention to provide an improved protected signaling system. It is also an object that the system have relative simplicity and reduced cost while including the above-described advantages.

It is another object of this invention to eliminate the delay in sending new action words during the station's transmission interval.

Additional assurance can be provided by utilizing a protected code of the action word. Typical protection codes include redundant error checking bits or elements, sometimes called parity bits. These bits, together with the information bits of the data word, provide a predetermined binary accumulation or sum for each word. Thus, if the received word fails to provide the sum (generally odd or even), a mutilation in the transmission or reception of the word is indicated.

It is a further feature of this invention to provide further assurance in a protected selective signaling system by using an error detecting code. Each answerback, therefore, assures the sending station that an unmutilated data word was received by the remote station.

SUMMARY OF THE INVENTION

The present invention features a memory or store which accommodates both the action words and the acknowledgments. The store advantageously comprises a plurality of memory elements, such as relays. Certain ones of the memory elements are dedicated to an operated by an external action signal, thus storing the designation of the action word to be transmitted. Other ones of the memory elements are dedicated to individual acknowledgment codes and operated by the reception of the corresponding action word from a remote station. Accordingly, a simplified arrangement is provided wherein action codes and acknowledgment codes are scanned and transmitted during the same discrete transmission interval.

It is another feature of this invention that the operated action code memory element is released when the corresponding acknowledgment word is received from the remote station. Since the memory element remains operated in the absence of an acknowledgment, the action designation is rescanned and the code word is retransmitted each discrete transmission interval until the answerback is received.

The foregoing and other objects and features of this invention will be more fully understood from the following description of an illustrative embodiment thereof taken in conjunction with the accompanying drawings.

GENERAL DESCRIPTION

Figures 1, 6:
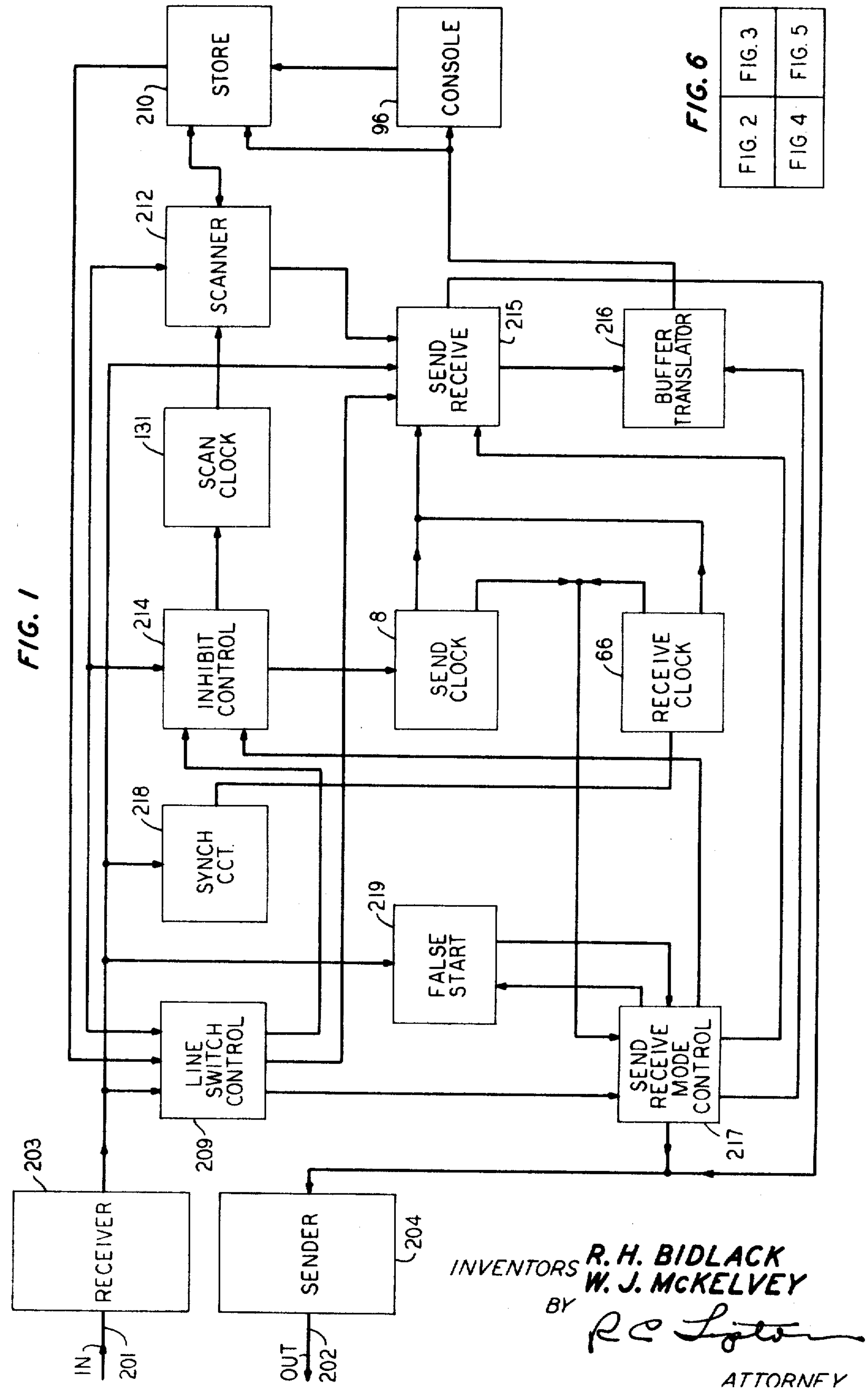
FIG. 1 illustrates, in block form, the various functional equipment of a station in accordance with the invention.

In general, the system comprises two substantially identical stations connected by a two-way transmission line represented by lines 201 and 202 in FIG. 1. Each station is arranged as shown in FIG. 1 to send protected data code words to outgoing line 202 in accordance with the storage of memory store 210. Alternatively, the station is arranged to receive incoming data words on line 201, check the correctness of the reception of each data word, determine whether the data word constitutes an action word or an acknowledgment to an action word previously transmitted to the remote station, reset store 210 when an action word is acknowledged and alternatively store in memory 210 an acknowledgment code designation when the incoming data word comprises an action code, and finally indicate to console 96 the action instructions and acknowledgments received.

In FIG. 1, the console is generally indicated by block 96. Console 96 may be considered external to the transmission system and comprises a source of actions or instructions. These actions or instructions may be in a form of operations of conventional mechanical switches. In addition, console 96 includes indicating devices which may assume the form of lamps.

Store 210, as previously disclosed, comprises the memory of the station. Advantageously, store 210 may include a plurality of memory devices. Each source of action or switch in console 96 has a corresponding memory device in store 210. In addition, each acknowledgment code has a corresponding memory device in store 210, The data words, when transmitted on line 202 and received on line 201, are in the form of tone signals in accordance with the present embodiment. Receiver 203 functions to accept the tone signals from incoming line 201 and converts the signals to appropriate DC signals. Sender 204 accepts outgoing data words in DC form and converts them to AC tone signals for application to outgoing line 202.

In accordance with the disclosed embodiment, each data word comprises a series of signal elements which include initial start elements, intermediate information elements, and concluding parity bit elements. The start elements indicate to the receiving station the start of a word transmission. The information elements designate the particular action or acknowledgment word which is being transmitted. Finally, the parity bit elements define the parity of the data word, whereby a protected code is utilized to insure correct transmission and reception of the word.

The station functions in the half-duplex mode, that is, the station can alternatively send or receive, but not both at the same time. Determination of the SEND or RECEIVE mode is provided by line switch control 209. Starting from the idle condition, line switch control 209 places the station in the SEND mode if there are no signals incoming over line 201, in addition, store 210 contains at least one operated memory device. During this SEND mode, store 210 is scanned by scanner 212 and a data word is transmitted corresponding to each of the operated memory devices. Specifically, scanner 212 is advanced by scan clock 131 to scan store 210 until an operated memory device is detected. Thereupon, scanner 212 applies to SEND-RECEIVE circuit 215 a permutation of information elements corresponding to the advance of scanner 212 which, in turn, corresponds to the operated one of the memory devices. SEND-RECEIVE circuit 215 thereafter applies to sender 204 the information elements together with the appropriate parity bit elements as described hereinafter. Scanner 212 then continues to scan store 210, applying information elements to SEND-RECEIVE circuit 215 when each operated memory device is detected. At the termination of the scan, line switch control 209 returns the station to the idle condition.

With the station in the idle condition, line switch control 209 places the station in the RECEIVE mode if incoming signals are received on line 201. The station thereafter will return to the idle mode when the signals on incoming line terminates.

The generation of the start elements of the data word is provided by SEND-RECEIVE mode control circuit 217. This circuit, when placed in the SEND mode by line switch control 209, provides a count of the clock pulses from SEND clock 8. In accordance with this count, SEND-RECEIVE mode control circuit 217 generates the start signal elements and applies them to sender 204. Thereafter SEND-RECEIVE mode control circuit 217 enables SEND-RECEIVE circuit 215 to clock out the information elements of the data word, generate the parity bit elements, and clock out these latter elements. When the clock count indicates the end of the data word, SEND-RECEIVE mode control circuit 217 resets inhibit control 214 to re-enable scan clock scanner 131 to again advance scanner 212.

When line switch control 209 places the station in the RECEIVE mode, SEND-RECEIVE mode control circuit 217 is advanced by the clock pulses from RECEIVE clock 66. During the reception of the incoming start signal elements, SEND-RECEIVE mode control circuit 217 enables false start circuit 219 to check the correctness of the start signal. Upon SEND-RECEIVE mode control circuit 217 advancing to the intervals corresponding to the information signal elements, SEND-RECEIVE circuit 215 is enabled to accept the incoming signals and is arranged to check the incoming parity bits with locally generated parity bits, which locally generated parity bits are derived from the incoming information elements. Finally, assuming the incoming data word is received correctly, SEND-RECEIVE mode control circuit 217 enables buffer translator 216 to read out and translate the data word received by SEND-RECEIVE circuit 215.

Summarizing a cycle of operation of a station, such as the station shown in FIG. 1, assume first that incoming line 201 is idle. Further assume that a switch in console 96 is operated, operating in turn the corresponding memory device in store 210. Alternatively, it may be assumed that an action code word has previously been received and translated by buffer translator 216 which thereby operated the memory device in store 210 corresponding to the acknowledgement for the action word. In either event, store 210 indicates to line switch control 209 that a code word is available; and, with incoming line 201 idle, line switch control 209 places the station in the SEND mode.

With the station in the SEND mode, inhibit control 214 enables scan clock 131. This provides clock pulses to scanner 212 which, in turn, proceeds to scan store 210. Upon detecting an operated memory device, scanner 212 resets inhibit control 214. This stops scan clock 131 and starts SEND clock 8. In addition, scanner 212 dumps the information elements of the data word in parallel into SEND-RECEIVE circuit 215.

As previously described, SEND-RECEIVE mode control 217 follows the clock pulses from SEND clock 8, initially generating the start signal elements of the data word. These start signal elements as passed to sender 204 and then to the remote station as tone signals by way of outgoing line 202.

After the generation of the start signal elements, SEND-RECEIVE mode control circuit 217 enables SEND-RECEIVE circuit 215 to send the information word elements, generate the parity bit elements, and finally send the data word parity to sender 204. Finally, SEND-RECEIVE mode control circuit 217, at the end of the transmission of the word, resets inhibit control 214. This stops SEND clock 8 and restarts scan clock 131. Scanner 212, therefore, resumes scanning of store 210.

In the event that another operated memory device is detected, the corresponding data word is transmitted in the same manner as previously described. After all the memory devices are scanned, terminating the cycle of the scanner of 212, inhibit control 214 is reset, stopping scan clock 131. In addition, line switch control 209 is knocked down returning the station to the idle mode. Line switch control 209, in the idle mode again, monitors incoming line 201 by way of receiver 203, and, in addition, monitors the memory devices in store 210.

Assume now that incoming signals are received on line 201. Line switch control 209 places the station in the RECEIVE mode. In this condition, synchronizing circuit 218 enables receive clock 66 when the initial transition of the start signal of the incoming data word is detected. In addition, SEND-RECEIVE mode control circuit 217 enables false start circuit 219 to examine the start signal as previously described.

In the event that an error occurs in the start signal, false start circuit 219 signals SEND-RECEIVE mode control circuit 217 which, in turn, resets the station whereby the data word is discarded. If the start signal is correctly received, SEND-RECEIVE mode control circuit 217 thereafter enables SEND-RECEIVE circuit 215 to accept the incoming signals from receiver 203. As previously described, SEND-RECEIVE circuit 215 accepts and stores the information elements, locally generates parity bit elements, and compares them with the incoming parity elements. Thus, at the end of the word reception, it is passed to buffer translator 216 which is enabled by SEND-RECEIVE mode control circuit 217 if the parity checks. If the incoming data word was an action code word, buffer translator 216 provides the appropriate action signal to console 96 for appropriate indication therein. In addition, buffer translator 216 operates a corresponding acknowledgment memory device in store 210 for subsequent transmission of the acknowledgment to the remote station. If the received data word comprises an ackonwledgment code word, buffer translator 216 may provide an indication to console 996 in any convenient manner and resets the action memory device corresponding to the station. If the received data word comprises an acknowledgment to the previously transmitted action code has been received correctly.

Finally, at the end of the received word, line switch control 209 awaits reception of the next data word. If no data word is received for a predetermined interval of time, line switch control 209 restores the station to the idle condition. This initiates a new cycle of operation of the station.

DETAILED DESCRIPTION

The details of the signaling system are disclosed in FIGS. 2 through 5, when arranged as shown in FIG. 6.

Figure 2:
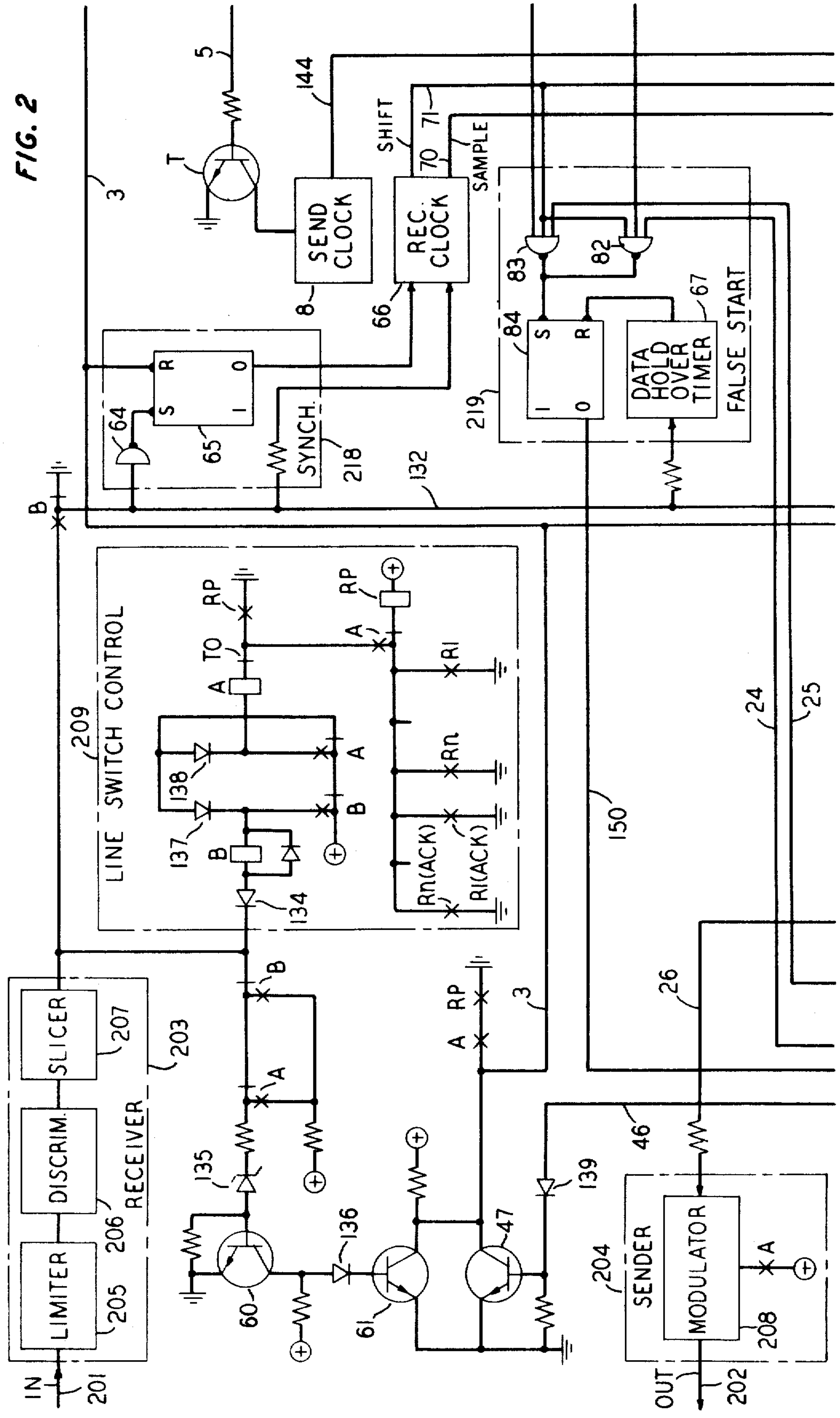
FIGS. 2 through 5, when arranged as shown in FIG. 6, show the details of the circuits and equipment which cooperate to form a station in accordance with the invention.

Consider first FIG. 2. Incoming line 201 is shown connected to receiver 203 with outgoing line 202 connected to sender 204, the designations of the line, the sender and the receiver being the same as previously described with respect to FIG. 1. Also shown in FIG. 2 is line switch control circuit 209, synchronizing circuit 218 and false start circuit 219, together with SEND clock 8 and RECEIVE clock 66.

FIG. 2 also discloses a general system "reset" circuit which includes transistors 47 and 61, together with the make contacts of relays A and RP connected in series between ground and lead 3. As described hereinafter, the system is reset when ground is applied to lead 3 due to either the concurrent operation of relays A and RP or the turn ON of transistor 47 or transistor 61, the turned ON transistor passing ground through the emitter to the collector circuit of the transistor to lead 3.

One instance wherein transistor 61 is turned ON involves a situation wherein relay A and relay B of line switch control 109 are released and the output of slicer 207 is low. This situation occurs, for example, when the station is idle and signals are initially received from the remote station, as described hereinafter. In this event, the base of transistor 60 has the low potential applied thereto, turning the transistor OFF. Positive battery is thus passed through diode 136 to the base of transistor 61. Accordingly, under this condition transistor 61 turns ON and ground is passed to lead 3. With relay A or relay B operating, however, positive battery is passed through the make contacts of the operated one of the relays to breakdown diode 135. Diode 136 thus passes positive battery to the base of transistor 60. This applies ground to its collector. The positive battery passed to diode 136 is thus removed and transistor 61 turns OFF. Accordingly, transistor 61 cannot pass ground to lead 3 when the station is in the SEND mode (relay A operated) or the RECEIVE mode (relay B operated).

Turning now to receiver 203, there is included therein limiter 205, discriminator 206 and slicer 207. As previously described, incoming signals comprise either marking tone or spacing tone or no tone, the latter condition indicating that the remote station is not in the SEND mode. These tones are limited by limiter 205 and passed to discriminator 206. Discriminator 206 converts these signals to appropriate DC signals which are further defined by slicer 207. Specifically, the output of the slicer goes positive when spacing tone is received, or, alternatively, when no tone is received. Conversely, the output of the slicer provides a ground potential when marking tone is received.

Sender 204 includes modulator 208. The signal input to modulator 208 is derived by way of lead 26. Power to modulator 208 is supplied by way of the make contacts of relay A. When the station is in the SEND mode, as previously described, relay A is operated and modulator 208 is therefore energized. In the SEND mode condition, the application of a marking signal to modulator 208, as indicated by a low potential condition on lead 26, results in the production of a marking tone to output lead 202. Conversely, a high condition on lead 26 produces a spacing tone on output lead 202. Finally, when the station is not in the SEND mode, relay A is released, as described hereinafter, and modulator 208 does not produce any tone for application to output end 202.

Figure 3:
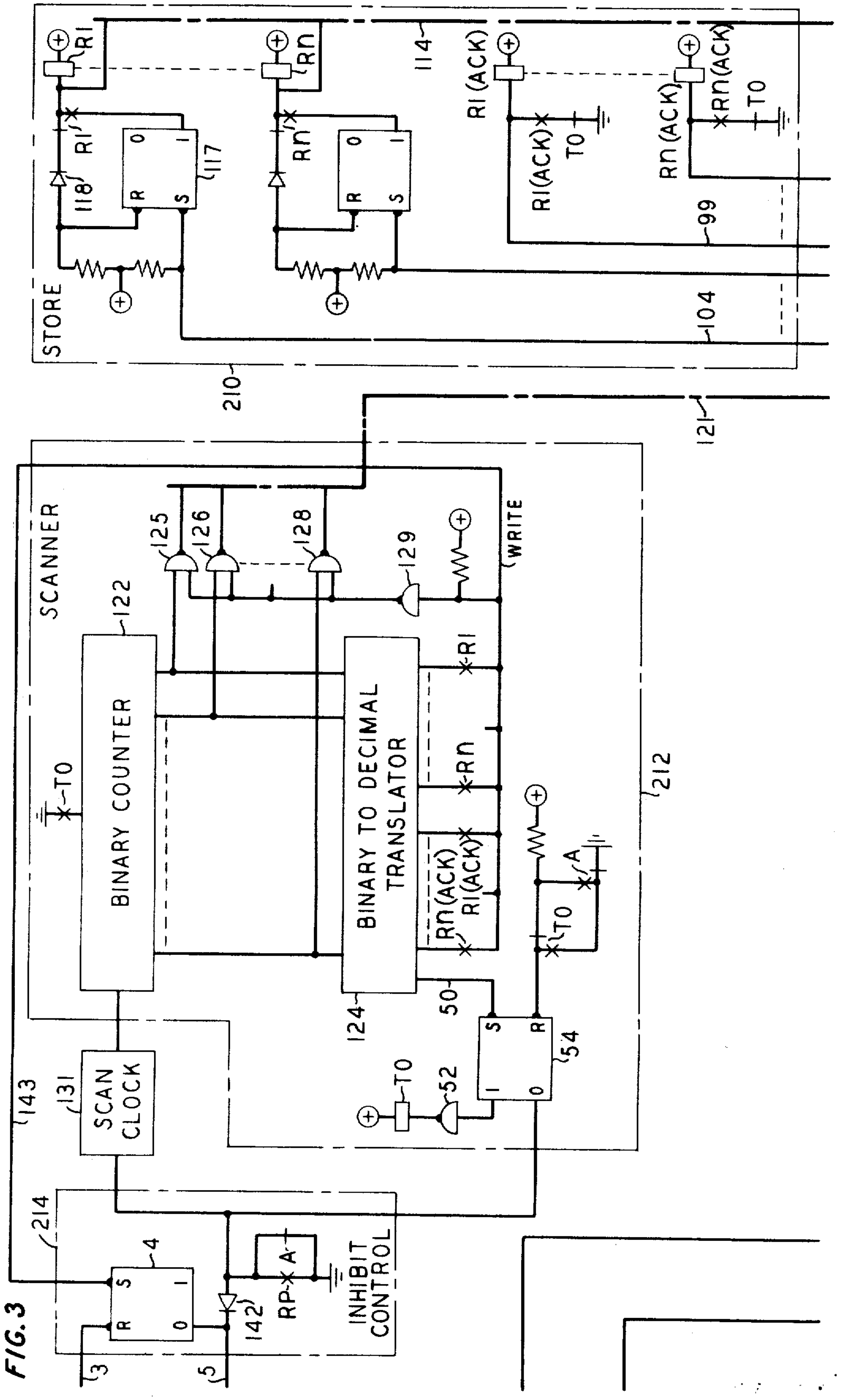
Figure 4:
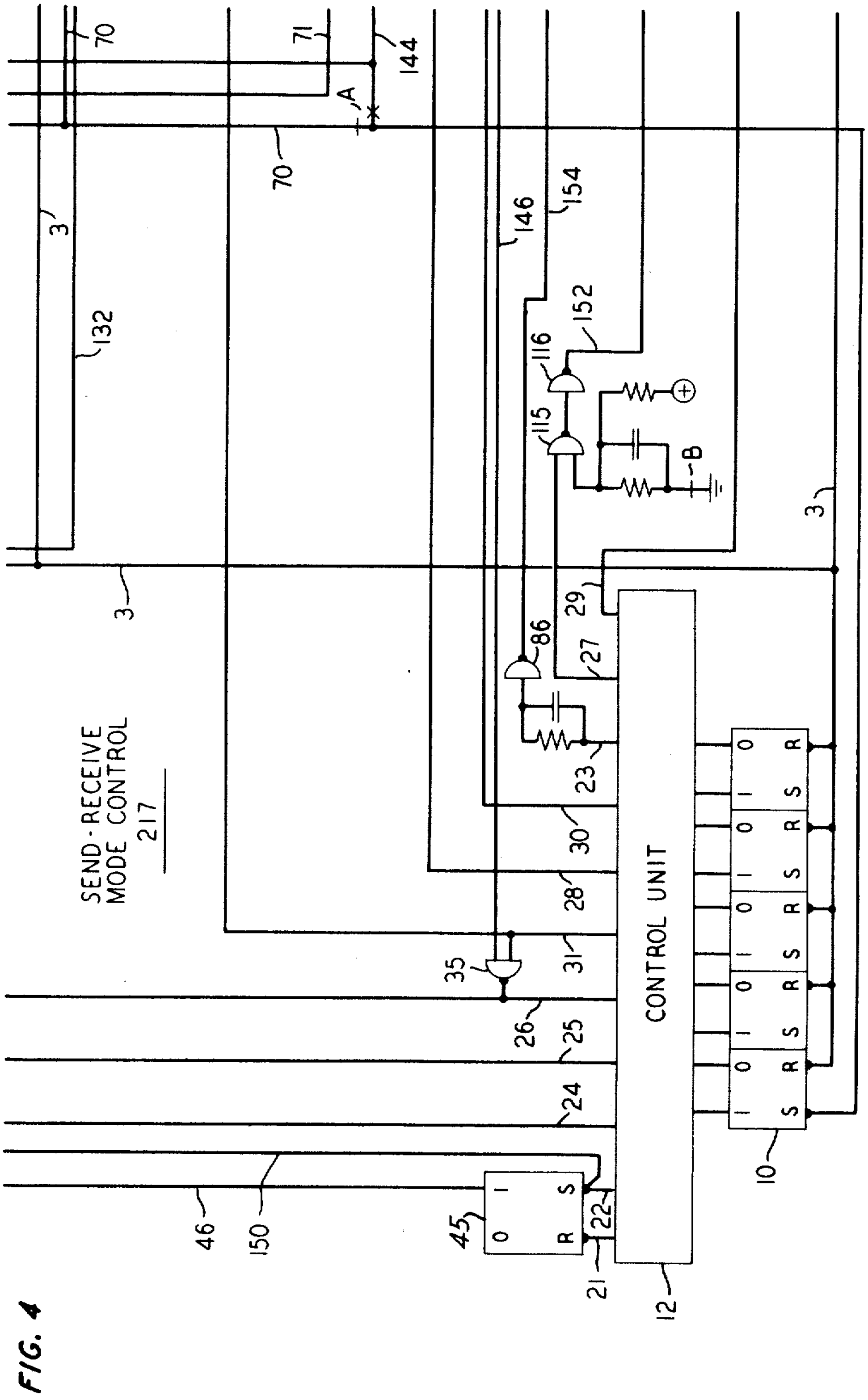

The SEND-RECEIVE mode control circuit 217 is shown in FIG. 4. SEND-RECEIVE circuit 215 is generally disclosed in FIG. 5. In addition, FIG. 5 contains the buffer translator generally shown in block 216 and the console shown in block 96. SCAN clock 131 and inhibit control circuit 214, scanner 212 and store 210 are shown in detail in FIG. 3.

Return now to console 96. As previously described, this console includes a plurality of function keys or contacts, each of which represent a function or action and may be manually or mechanically operated. These keys are represented in console 96 by contacts $FK_1$ through $FK_n$. The operation of any one of these keys passes ground therethrough and then through common cable 114 to store 210 in FIG. 3. Console 96 also terminates the plurality of incoming leads, such as leads 107 and 109. These leads may extend to relays or indicating devices, such as lamps, which will be momentarily flashed or maintained energized in any well known manner, not shown, when ground is passed to the incoming lead extending to the indicating device.

Store 210 in FIG. 3, includes a plurality of action relays, such as relays $R_1$ through $R_n$ and a plurality of acknowledgement relays, such as $R_1$(ACK) through $R_n$(ACK). Considering first action relay $R_1$, it is seen that the relay extends by way of common cable 114 to contacts $FK_1$ in console 96. Accordingly, the operation of contact $FK_1$ operates relay $R_1$. At the same time the ground from contact $FK_1$ is passed through break contacts of relay $R_1$ and diode 118 to the RESET input of flip-flop 117. This negative transition resets flip-flop 117, whereby output terminal 1 goes to ground. This ground provides the locking path for relay $R_1$ by way of the relay's make contacts. Thus, the operation of contacts $FK_1$ operates relay $R_1$ and resets flip-flop 117. Similarly, the operation of any of the other contacts, such as contacts $FK_n$, operates a corresponding action relay, such as relay $R_n$, and concurrently sets the flip-flop connected with the action relay.

Acknowledgment relay $R_{n1}$(ACK) is operated by the application of ground to lead 99. This ground is applied in response to the reception by the station of a predetermined acknowledgment code, as described hereinafter. With relay $R_1$(ACK) operated, the relay locks by way of its own make contacts to the break contacts of relay TO. Similarly, other acknowledgment relays, such as $R_n$(ACK), are operated by ground applied thereto when a corresponding acknowledgment code is received by the station, the relay thus operating locking to make contacts of relay TO. With any one or more of the action relays or the acknowledgment relays operated, inverter 129 in scanner 212 is connected to binary-to-decimal translator 124. This will enable output gates 125 through 128 of binary counter 122, when binary counter 122 advances to a count corresponding to the operated one of the relays, as described hereinafter. In addition, the operation of any one of the relays in store 210 passes ground to relay RP in line switch control 209 when relay A is released. This indicates to the station that store 210 contains information in the form of an operated relay.

The operation of relay RP passes ground in inhibit control 214 to SCAN clock 131. The effect of this ground is to inhibit SCAN clock 131 and therefore preclude the passing of pulses to scanner 212. Thus, with relay RP operated, the operation of SCAN clock 131 is precluded.

It is noted that relay RP can only operate with relay A released and, as described hereinafter, relay A is operated when the station is in the SEND mode. Accordingly, relay RP is permitted to operate when the station is in the idle condition or is in the RECEIVE mode.

If it be assumed that the station is in the idle condition and it be further assumed that no signals are being received from the remote station, relay RP operated extends ground to relay A in line switch control 209 by way of the break contacts of relay TO. The operating current for relay A then passes by way of diode 138 and break contacts of relays A and B whereby relay A operates and locks by way of its own make contacts and the break contact of relay B and also locks by way of its own make contacts and the operated ones of the store relays. Thus, with the station idle the operation of relay RP functions to operate relay A.

Assuming now that the station is receiving signals from the remote station, the output of slicer 207 alternates between a high condition and a low condition. In this, the RECEIVE mode, slow-to-release relay B is in the operated condition, as described hereinafter. The incoming signals from slicer 207 are passed by way of diode 134 to relay B with the output of slicer 207 going to ground each time a marking tone is received. Thus, the incoming signals maintain relay B operated.

Upon the termination of the incoming signals, incoming tone on line 201 ceases and the output of slicer 207 goes high. This removes the operating current for relay B. Relay B thus releases, completing the previously described operating path for relay A.

Accordingly, relay A operates upon the operation of relay RP when the station is in the idle mode and relay A operates with relay RP operated when the RECEIVE mode of the station terminates, as indicated by the release of relay B.

The operation of relay A opens the operating path for slow-to-release relay RP. Relay A operated also supplies power to modulator 208, as previously described, whereby tone is passed to output lead 202. As described hereinafter, lead 26 is in the low condition at this time, whereby idle line marking tone is sent to output line 202.

The marking tone is maintained on line 202 for the interval necessary for slow-to-release relay RP to drop down. This marking tone interval is utilized to provide certain supervision and switching functions in the remote station, as described hereinafter. In addition, with both relay A and relay RP operated ground is passed through the make contacts of these relays to RESET lead 3, as previously described. This resets the station circuits, as described hereinafter. Finally, relay A operated applies ground to gates 79 and 80 in SEND-RECEIVE circuit 215 to disable these gates whose functions are described hereinafter.

When relay RP releases and with relay A operated, application of ground through make contacts of relay RP or break contacts of relay A to SCANNER clock 131 is removed. Flip-flops 4 and 54 are normally reset, their output terminals "0" are high and no disabling ground is applied to clock 131. Thus the SCANNER clock is enabled and proceeds to apply clock pulses to binary counter 122 in scanner 212 to advance the counter.

With SCANNER clock 131 enabled, binary counter 122 proceeds to advance from its initial "0" position, stepping in response to each pulse from the clock. The binary outputs of counter 122 are passed to write gates 125 through 128 and to binary-to-decimal translator 124. Translator 124 is arranged in any suitable manner to ground consecutive output leads in response to each advance of counter 122. The output leads of converter 124 extends to individual ones of the make contacts of the action and acknowledgment relays. Accordingly, the contacts of the relays are sequentially pulsed as binary counter 122 is advanced.

Assume now that one of the store relays is operated and the binary count advances to the output lead associated with this operated relay. The lead connected thereto is grounded and this ground is passed through the make contacts of the relay to "write" lead 143 and to the SET input of flip-flop 4. This negative transition sets flip-flop 4. The setting of flip-flop 4 reapplies ground from output terminal "0" to SCANNER clock 131 via diode 142, whereby the clock stops. Accordingly, binary counter 122 stops at the count corresponding to the operated store relay.

The ground on "write" lead 143 is also passed to inverter 129 which in turn applies a positive enabling potential to gates 125 to 128. The gates thus pass the outputs of binary counter 122 through common cable 121 to the SET inputs of the stages of shift register 120 in SEND-RECEIVE circuits 215. Since the output of each gate goes low when a high condition is applied thereto by counter 122, the corresponding stage of register 120 is SET, which constitutes inserting a spacing bit in the register, the stages normally being in the reset condition, as described hereinafter, and thus initially storing marking bits. Accordingly, shift register 120 is coded with the count designating the operated store relay when gates 125 through 128 are enabled.

The setting of flip-flop 4 also passes ground via lead 5 to transistor T, turning it OFF. This removes disabling ground from SEND clock 8. SEND clock 8 thus starts up, applying pulses by way of lead 144 to gate 9 in send-receive circuit 215 and, by way of make contacts of relay A, to 5-stage binary counter 10 in send-receive mode control circuit 217. Gate 9 is disabled by lead 31 at this time, however, by control unit 12 in send-receive mode control circuit 217, as described hereinafter. Binary counter 10 is in the "0" count, having been reset to this count by the ground previously applied to RESET lead 3. Accordingly, send clock 8 now proceeds to advance binary counter 10, starting with the count of "0."

The outputs of counter 10 define the advance of the counter. These outputs extend to control unit 12. Control unit 12 includes conventional logic circuitry which converts the outputs of binary counter 10 to a permutation of signals on the output leads of control 12. It is noted that control unit 12 has eleven output leads, designated leads 21 through 31. With the binary counter in the initial "0" count, lead 21 is in the low condition state. This lead, however, goes to the high condition for all other counts of binary counter 10.

Continuing on with lead 22, the condition on the lead is normally high, going low when binary counter 10 is on the count of twenty-three. Lead 23 is normally high, going low for the count of fourteen. Lead 24 is high when binary counter 10 advances to counts one, two, three and five and is low for all other counts. Lead 25 is high for the count of four and low for all other counts. Lead 26 is low for the initial count of "0" and four and high for all other counts.

Control unit 12 is also arranged to maintain lead 27 normally high, with the exception of the count of thirteen. Lead 28 is normally high, with the exception of the count of fourteen. Lead 29 is high for the count of twenty-two and low for all other counts. Lead 30 is high for the counts from fifteen through twenty-three and low for all other counts. Finally, lead 31 is low for counts one through five and high for count six and all counts thereafter of binary counter 10.

Returning now to the enabling of SEND clock 8 and the advancing of binary counter 10, it is noted that, in the initial count, lead 26 is low, providing a marking signal to modulator 208. Accordingly, modulator 208 initially sends a marking tone to the line when the station goes to the SEND mode by operating relay A. Binary counter 10 now advances to the count 1, removing the low condition from lead 26. At this time gate 35 is applying a high condition to lead 26 since input lead 31 is in the low condition. Thus lead 26 has no ground condition applied thereto, passing a high condition to modulator 208 which, in turn, passes spacing tone to line 202. This spacing tone is maintained for the counts two and three of binary counter 10. When counter 10 attains the count of four, however, lead 26 again goes low, reapplying a marking signal to modulator 208 and thus a marking tone to line 202. The advancing of counter 10 to the count of five restores lead 26 to the high condition and modulator 208 again applies a spacing tone to the output line. These first five signals constitute the start signal, which comprises the sequence of three spacing or "0" bits followed by a marking or "1" bit and concluded with another spacing or "0" bit.

When binary counter 10 advances to the count of six, lead 26 goes high and is maintained high for the remaining counts, as previously described. At this time lead 31 goes high. Lead 31 extends to gate 35, enabling this gate. The other input to gate 35 is connected via lead 146 to output terminal "0" of the final stage of shift register 120. Accordingly, the bit in the final stage of the shift register is passed through gate 35 to modulator 208 and thence to the line. That is, with a marking or "1" bit in the final stage, the output of gate 35 goes low, lead 26 applies a low condition to modulator 208 which applies a marking tone to output line 202 and, conversely, with a "0" bit in the last stage, the output of gate 35 remains high, permitting modulator 208 to pass a spacing tone to the output line.

Figure 5:
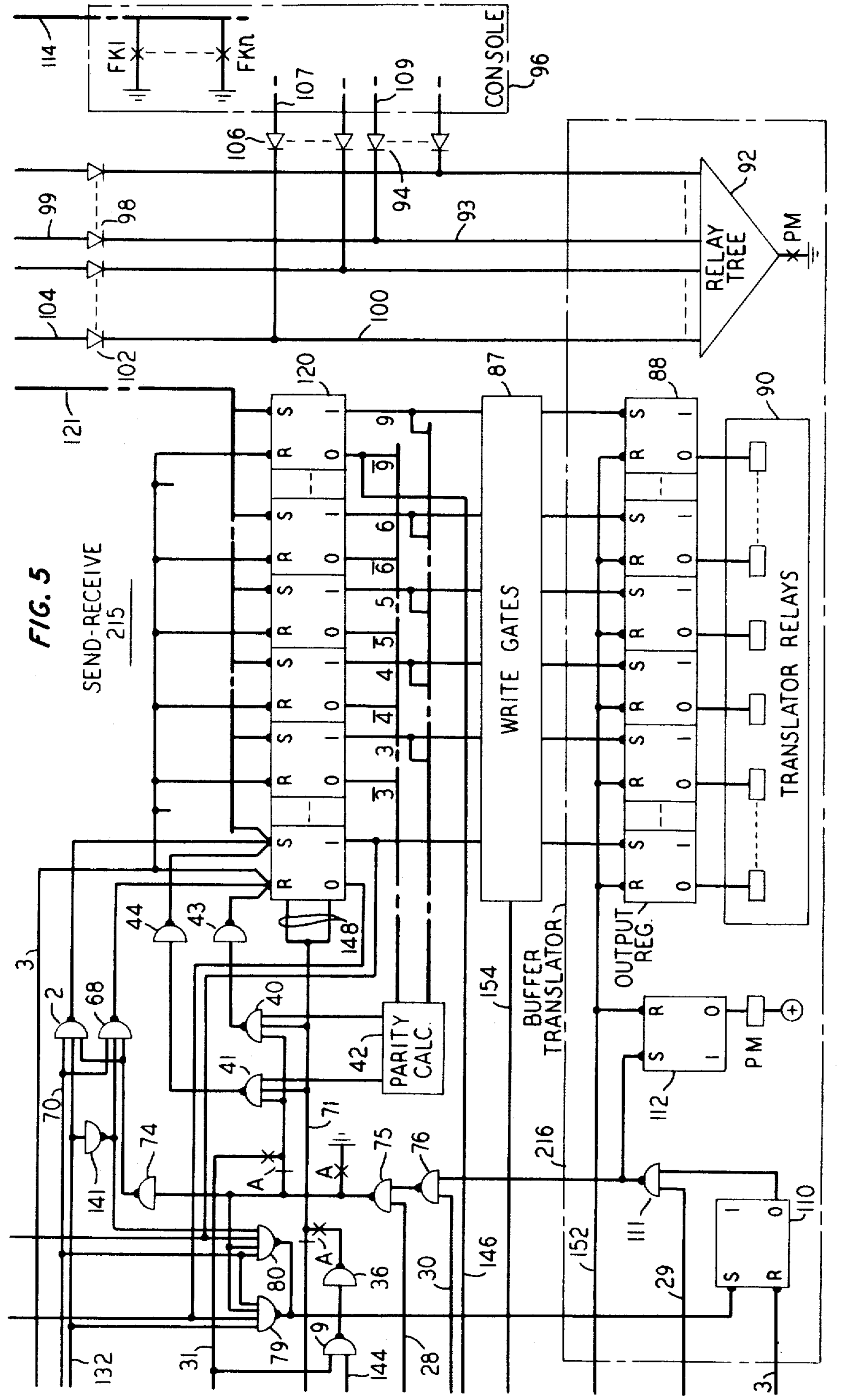

The high condition on lead 31 also enables gate 9, FIG. 5. Accordingly, upon the next clock pulse from SEND clock 8, binary counter 10 advances to the count of seven and the clock pulse is also passed via lead 144 through gate 9, inverter 36 and make contacts of relay A to the input shift leads 148 of shift register 120. Thus, SEND clock 8 provides a shift pulse to shift register 120 to shift bits stored therein one stage and a new bit to the final stage and then via gate 35 to sender 204 and the output line.

The output of inventer 36 is also connected to the inputs of gates 40 and 41. Other inputs of gates 40 and 41 are connected to the output of parity calculator 42. Parity calculator 42, in turn, is connected to the outputs of stages 3 through 6 and 9 of shift register 120. The function of parity calculator 42 is to generate the Bose-Chaudhuri parity check code. The arrangement of parity check code generators of this type is well known in the art.

Returning now to gates 40 and 41, it is noted that the other inputs of these gates are connected to lead 31 via make contacts of relay A. Lead 31 is high at this time to enable gates 40 and 41.

Accordingly, upon the next clock pulse of SEND clock 8, binary counter 10 advances to the count of eight and the information in shift register 120 is shifted one stage. Concurrently, the output of the parity calculator, as previously derived from stages 3 through 6 and 9 of shift register 120, is applied to gates 40 and 41 and passed through the gates due to the application of the shift pulse thereto. The gate outputs are passed by way of inverters 43 and 44 to the inputs of the initial stage of shift register 120. It is noted that inverters 43 and 44 function to invert the outputs of gates 40 and 41, permitting the inputting to occur at the trailing edge of the shift pulse.

The application of the shift pulse to the shift register thus advances the bits therein one stage. The new bit in the last stage is passed out through gate 35 to the output line. In addition, this new setting of the shift register and especially stages 3 through 6 and 9, is monitored by parity calculator 42, which generates parity bits and inserts them via gates 40 and 41 in the first stage of shift register 120.

When the next pulse of SEND clock 8 is provided, binary counter 10 advances to count nine, shift register 120 is again shifted, the fourth bit is passed to sender 208 and the new parity bits are inserted in the first stage in the same manner as previously described. This cycle is continued until all nine of the information bits are shifted out to the line to the last stage of shift register 120 and thus to the output line, at which time binary counter 10 has advanced to the count of fourteen. With the generation of successive pulses by SEND clock 8, the parity bits calculated by parity calculator 42 are now shifted out to the line until all eight parity bits are passed to the line, at which time binary counter 10 has advanced to the count of twenty-two.

At the termination of the transmission of the last parity bit binary counter 10 advances to the count of twenty-three. This drops the potential on output lead 22 of control unit 12. The negative-going transition sets flip-flop 45, which, in turn, applies a high condition to lead 46. The condition on lead 46 is passed through diode 139 to transistor 47. Transistor 47 turns ON, passing ground to RESET lead 3. Accordingly, binary counter 10 is reset, terminating the transmission of the data word corresponding to the operated register relay. At this time output lead 21 of control unit 12 goes low, resetting flip-flop 45.

The pulsing of RESET lead 3 also resets shift register 120 and, in addition, resets flip-flop 4. This reapplies a high condition to the base of transistor T which disables SEND clock 8 and, in addition, removes the ground applied to SCANNER clock 131 by way of lead 5 and diode 142. Accordingly, binary counter 122 is again pulsed by clock 131 until it advances to another operated one of the store relays. When an operated relay is again encountered the scanning is stopped and a new word is transmitted in the same manner as previously described.

After all of the store relay contacts are scanned binary counter 122 advances to its final count. At this count binary-to-decimal translator 124 grounds output lead 50. This sets flip-flop 54. Flip-flop 54 set, passes ground from the output terminal "0" to disable SCANNER clock 131. In addition, output terminal "1" passes a high condition to inverter 52. Inverter 52 thus applies ground to relay TO which is therefore operated.

The operation of relay TO releases all of the operated ones of the acknowledgment relays in the store 210 by opening each locking path, as previously described. In addition, relay TO operated applies a RESET pulse to binary counter 122, resetting it to its initial or "0" condition. Relay TO operated also opens the operating path of relay A and this relay releases. The release of relay A opens the power supply for modulator 208, whereby signal sending is terminated and all tone is removed from the output line. Relay A released also re-establishes the operating path for relay B, permitting the latter relay to monitor the line for incoming signals, as described hereinafter. In addition, relay A released provides ground to the RESET input of flip-flop 54 whereby the flip-flop is reset. Finally, relay A released re-applies disabling ground to the SCANNER clock 131.

The resetting of flip-flop 54 removes the energizing current applied to relay TO by inverter 52. Relay TO is made slow-to-release, however, whereby an interval occurs before the relay can release. This is to maintain the operating path of relay A open, precluding the re-establishment of the station as a sending station until the remote station has ample time to establish itself as a sender. Thus, a station must permit the remote station an opportunity to send. If the remote station fails to send after, for example, about two seconds, relay B will not operate, permitting relay A an opportunity to re-operate, assuming at least one store relay is operated, as previously described.

Prior to the reception of signals from the remote station, no tone is received over line 201 and the slicer 207 presents a high condition to its output. The remote station initiates transmission by sending an initial marking tone, as previously described. In response to the reception of this tone the output of slicer 207 goes low. This low or ground signal is passed by way of the break contacts of relay B and the break contacts of relay A to breakdown diode 135. Thus the application of a high condition to the base of transistor 60 is removed and this transistor turns OFF. This removes the application of ground applied to the base of transistor 61 and a high potential is passed via diode 136 to the base of transistor 61. Accordingly, transistor 61 turns ON, passing ground by way of its collector to RESET lead 3. Thus, upon the initial reception of tone from the remote station the local station circuitry is reset, as previously described.

The low signal output of the slicer is also passed to relay B via diode 134. This prepares an operating path for relay B to positive battery by way of diode 137, break contact of relay A and break contact of relay B. Relay B thus operates and locks to positive battery. It is noted that relay B is sufficiently slow to release so that it is maintained operated during normal incoming signaling.

With relay B operated, breakdown diode 135 is connected to positive battery by way of make contacts of relay B. This turns ON transistor 60, turning OFF, in turn, transistor 61. Ground is thereby removed from RESET lead 3.

Relay B operated also extends the output of slicer 207 to lead 132. Lead 132, in turn, extends to send receiver circuit 215, FIG. 5. Specifically, lead 132 is connected to gates 2 and 79 and, via inverter 141, to gates 68 and 80. As described in detail hereinafter, gates 2 and 68 constitute input gates to shift register 120 and gates 79 and 80 are utilized for checking the parity of the incoming data words.

Lead 132 is also connected to inverter 64 in synch circuit 218, to one input lead of RECEIVING clock 66 and is also connected to the input of data holdover detector 67 in false start detector 219. Data holdover detector 67 functions to provide a high output when a high input signal is applied thereto. The output, however, is maintained for a predetermined interval of time after the high input is removed. The function of data holdover detector 67 will be described hereinafter.

After the initial marking tone is received from the remote station the START signal appears on the line. It is recalled that this START signal comprises three spacing bits followed by a marking bit and followed by a final spacing bit. The first spacing bit of the START signal raises the output potential of the slicer. This positive transition is passed to data holdover detector 67, operating as previously described. In addition, inverter 64 converts the transition to a negative-going transition, setting flip-flop 65. The setting of flip-flop 65 passes an enabling potential to clock 66.

Clock 66 preferably comprises a free running multivibrator having a frequency slightly less than the incoming signaling frequency. The outputs of the clock are provided to sample lead 70 and shift lead 71, both of these leads being in the low condition when the clock is disabled.

With flip-flop 65 placed in the SET condition, as described hereinafter, clock 66 is enabled, thereby providing clock pulses to leads 70 and 71, the sample pulse on lead 70 occurring at the theoretical midpoint of the incoming bit and the shift pulse on lead 71 occurring 180 degrees out of phase with the sample pulse. Incoming mark-to-space transitions and the corresponding positive transitions of the output of slicer 207 are utilized by clock 66 at its input to advance the phase of the clock and lock it in phase with the incoming data transition in a manner well known in the art.

Sample pulse lead 70 extends to gates 2 and 68. As previously described, gate 2 is connected to the output of slicer 207 while gate 68 is connected through inverter 141 to the output of the slicer. The output of inverter 74 comprises the third input for gates 2 and 68. Inverter 74, in turn, extends to the output of gate 75. At this time the output of gate 75 is low since both of its inputs are high, one input comprising lead 28 which, as previously described, is only low when binary counter 10 advances to the counts of fourteen and fifteen. The other input to gate 75 is connected to the output of gate 76, which is normally high, as described hereinafter.

Returning now to gates 2 and 68, with the outputs of inverter 74 high the application of a sample pulse to lead 70 enables the gates to pass the data bit from the output of slicer 207 to shift register 120. Specifically, when a space signal is being received, all of the inputs of gate 2 are high and a negative pulse is, therefore, passed to the SET side of the first stage of shift register 120, thereby inserting a space bit therein. Conversely, when a mark signal is being received, a high condition is passed to gate 68 by inverter 141 and the sample pulse on lead 70 enables the gate to apply a negative pulse to the RESET side of the first stage of the shift register, thereby inserting a mark bit therein. Accordingly, at the theoretical midpoint of each incoming data bit a sample bit is generated by clock 66, as previously described, and the incoming signal is stored in the shift register by way of gates 2 and 68.

The sample pulse lead 70 also extends by way of the break contacts of relay A to the input of binary counter 10. Thus, binary counter 10 maintains a count of the incoming data elements, advancing to the count of 1 when the first signal element is sampled and to subsequent counts as each subsequent element is sampled. Finally, sample lead 70 extends to gates 79 and 80, which are parity match gates. The function of these gates will be described hereinafter. It is noted that at this time parity match gates 79 and 80 are disabled by the low condition applied thereto by the output of gate 75.

As described above, the first space signal of the incoming start signal starts up clock 66. The theoretical midpoint of the first space element is sampled and passed to the shift register to SET the first state. Thereafter, clock 66 generates a shift pulse, which is applied to shift pulse lead 71. Shift pulse lead 71 extends by way of the break contact of relay A to input shift pulse leads 148 of shift register 120 and also to inputs of gates 40 and 41. Gates 40 and 41 are disabled at this time by the low output of gate 75. It is thus noted that the shift pulses are now provided by RECEIVE clock 66 rather than SEND clock 8.

Shift pulse lead 71 also extends to gates 82 and 83 in false start detector 219. At this time, output lead 24 of control unit 12 is high since the first sampled pulse advanced binary counter 10 to the count of one. Gate 82 is therefore enabled by the shift pulse and the high condition on lead 24 and output terminal "0" of the first stage of shift register 120 is examined. The gate will thus pass a negative pulse to the output thereof in the event that a mark signal has been inserted in the first stage of the shift register. Since the first element of the starting signal is spacing, output gate 82 generates a negative pulse if an improper bit, i.e., a mark bit, is stored in the shift register. Alternatively, if a proper signal, a spacing bit, is stored in the first stage of the shift register, the "0" output terminal of the first stage of the shift register is low and the output of gate 82 remains high.

Assume now that an improper mark signal is received as the first element of the start signal. The resultant negative pulse generated by gate 82 is passed to the SET input of flip-flop 84. Flip-flop 84 is set and the low condition at its "0" output terminal sets flip-flop 45 via lead 150. As previously described, the setting of flip-flop 45 applies a high signal to lead 46 which turns ON transistor 47. This, in turn, passes a pulse to RESET lead 3, resetting the station. Flip-flop 84 remains set and flip-flop 45 also remains set until data holdover detector 67 times out. This does not occur, as previously described, until incoming data ceases, whereupon the output of data holdover detector 67 goes down and flip-flop 84 resets. This permits the resetting of flip-flop 45 in the same manner as previously described.

If the first bit stored in the shift register is the proper spacing element, the output of gate 82 remains high, as previously described. Flip-flop 84 is, therefore, not SET and the circuit is prepared to sample the next incoming element. It is noted that concurrently with the scanning of the first element by false start gates 82 and 83, the shift pulse from lead 71 shifts the bit to the next stage of the shift register. Therefore, at the theoretical midpoint of the second element of the start signal a similar sampling takes place by gates 2 and 68 inserting the second bit in the first stage of the shift register. The subsequent shift pulse on lead 71 again enables false start gates 82 and 83 since lead 24 is still high. Thus, the false start sequence is again repeated and the second bit is checked to insure that a spacing bit has been received. At this time the shift register again shifts the bits in the shift register. Similarly, the third incoming element is scanned and stored in the shift register. False start gates 82 and 83 again examine the bit and the bits are again shifted in the shift register.

The next sampling pulse from clock 66 samples the fourth element of the start signal, which should be a marking signal. At this time the binary counter advances to the count of 4 and the potential on lead 25 goes high and on lead 24 goes low to disable gate 82. Thus, when the shift pulse is generated, gate 83 is enabled. The third input to gate 83 extends to the "1" output of the first stage of the shift register, whereby the gate generates a negative signal in the event that a spacing signal bit is stored in the first stage. This negative signal SETS flip-flop 84 which resets the circuit in the same manner as previously described.

Assuming that a mark signal is properly received, gate 83 is not enabled and the shift pulse shifts the signals in the shift register in preparation of the reception of the last element of the start signal. This element was previously described as a spacing signal and gate 82 is enabled by the high condition on lead 24. Accordingly, the 5-bit signal is examined and a false start condition is created in the event that any one of the bits are improper. Concurrently, the bits are stored in the shift register and shifted down the several stages.

After a correct reception of the start signal the nine information bits are received and passed from the output of slicer 207 to sampling gates 2 and 68 and thereafter stored in the shift register in the same manner as the reception and storage of the elements of the start signal. Concurrently, binary counter 10 is advanced by each of the sample pulses. Thus, after the sampling of the nine information elements, shift register 120 now has fully stored therein the information bits, with the start signal bits being discarded.

It is noted, that, prior to the storage of the last information element of the data word, binary counter 10 advances to the count of 13, lowering the potential on lead 27. The output of gate 115 thus goes high lowering in turn the output of inverter 116. The negative transition on lead 152 is passed to flip-flop 112 and output register 88 in buffer translator 216. Thus, flip-flop 112 is RESET and all mark bits are inserted in output register 88 when counter 10 attains the count of 13. It is also noted that when relay B releases at the termination of the RECEIVE mode, a negative pulse is passed to gate 115. Thus, lead 152 goes negative to reset buffer translator 216 when the RECEIVE mode terminates.

Returning now to the sampling and storage of the last information bit, binary counter 10 has advanced to the count of 14. Control unit 12 at this time lowers the potential on output lead 28. Accordingly, the output of gate 75 goes high, enabling parity match gates 79 and 80 and also enabling gates 40 and 41 by way of the break contacts of relay A. In addition, sampling gates 2 and 68 are disabled by inverter 74, whose output goes low in response to the high condition of gate 75. Thus, inputting to the shift register from the slicer is terminated.

Finally, with binary counter 10 at the count of 14, output lead 23 of control unit 12 goes low, pulsing lead 154 via inverter 86. This enables write gates 87 to transfer the output of shift register 120 to output register 88. Output register 88, in turn, controls translator relays 90. Specifically, a relay is provided for each stage of output register 88 and is operated by its corresponding register stage when a bit is transferred from the shift register to the output register stage. With translator output relays 90 operated, relay tree 92 enables a specific one of its plurality of outputs. Accordingly, a predetermined one of the outputs of relay tree 92 is enabled in accordance with the data word received and stored in shift register 120. This enabled lead is pulsed with ground as described hereinafter.

The enabling of gates 40 and 41, as described above, passes the output of parity calculator 42 to the first stage of the shift register when a shift pulse is provided to the gates by clock 66 through lead 71 and break contacts of relay A. Thus, when all of the information bits of the data word are stored in shift register 120 parity calculator 42 generates the first parity bit and applies it to gate 40 or 41 in the same manner as previously described with respect to the generation of the parity bit during the SEND mode. Then, upon the application of the shift pulse, the several information bits are advanced in the shift register and the parity bit is then passed by gate 40 or 41 and inverter 43 or 44 to the initial stage of shift register 120. This generated parity bit should be identical with the first parity bit received from the sender, assuming that the data word is received correctly, since identical parity calculations are made for both stations.

When clock 66 generates the next sample pulse which is applied to lead 70, it occurs at the theoretical midpoint of the incoming parity element. This pulse is applied to gates 79 and 80 to compare the outputs of the initial stage of shift register 120 with the incoming data parity bit. Consider first gate 79. This gate is enabled with the output of gate 75 high as previously described. The output of the slicer is connected to one input of gate 79 while the output terminal "0" of the initial state of shift register 120 is connected to another input of gate 79. Accordingly, the output of gate 79 goes low only in the event that a marking parity bit is inserted in the initial stage of shift register 120 and a spacing signal element is concurrently being received from the incoming line. Similarly the output of gate 80 goes low only in the event that a spacing signal is stored in the initial stage of shift register 120 and a marking signal is being received from the incoming line.

Assuming a failure of a parity match, the output of either gate 79 or gate 80 goes low. This results in the application of a negative transition to the SET input of flip-flop 110 in buffer translator 216. The setting of flip-flop 110 designates the failure of a parity match. Output terminal "0" of flip-flop 110, therefore, goes low and the output of AND gate 111 is maintained high. The effect of maintaining the output of gate 111 high is discussed hereinafter.

After the parity match check of the first parity bit the sample pulse steps binary counter 10 to the count of 15. This maintains the output of AND gate 75 high, permitting the next parity match. This next parity match occurs upon the generation of the sample pulse by clock 66, repeating the previously described operation.

Upon the generation of the next sample pulse binary counter 10 advances to the count of 16. At this count lead 30 is high, applying one high input to gate 76. Since lead 29 is low, gate 111 is applying a high condition to the other input of gate 76. Accordingly, gate 76 passes a low condition to gate 75, which, in turn, applies a high condition to gates 79 and 80. Thus, during the sixteenth count another parity match is provided in the same manner as previously described.

Similarly, for succeeding counts to twenty-two lead 30 remains high, whereby parity matches are made for the subsequent parity bits.

When the count of twenty-two is attained lead 29 goes high. If it be assumed that the parity bits have been properly matched, flip-flop 110 has not been SET, whereby the flip-flop applies a high condition to gate 111. Thus, the output of gate 111 goes low, driving the output of gate 76 high. Since lead 28 is now high, the output of gate 75 goes low, disabling the parity match circuit gates 79 and 80 and disabling gates 40 and 41.

With the output of gate 111 going low this condition is passed to the SET input of flip-flop 112. Accordingly, flip-flop 112 is SET and in this condition operates relay PM. The effect of the operation of relay PM will be discussed hereinafter.

In the event that a parity match failure is detected, flip-flop 110 is in the SET condition, as previously described. Consequently, the flip-flop passes a low condition to gate 111, maintaining its output high. Accordingly, the setting of flip-flop 112 is precluded. Under this situation binary counter 10 advances to the count of twenty-three, whereupon lead 22 goes low, setting flip-flop 45. This provides a high condition to lead 46, turning ON transistor 47. Transistor 47 passes a ground pulse to RESET lead 3, resetting binary counter 10 and flip-flop 110 and clearing out shift register 120. The circuit thus restores to its initial condition.

Return now to the operation of relay PM. Ground is applied through the break contacts of relay PM to relay tree 92. This ground is passed to the previously described enabled output of relay tree 92, thus pulsing a specific one of the outputs of the relay tree.

Assuming now that an action code is received, a selected one of the action code output leads, such as lead 93, is pulsed with ground via the make contacts of relay PM. This pulse is passed by way of diode 94 to lead 109 in console 96, advising console 96 that the action code character has been received by the station. Console 96 can, thus, operate to indicate this reception such as by energizing a lamp in any well known manner. In addition, the pulsing of lead 93 passes an energizing pulse by way of diode 98 to acknowledgment lead 99, thereby operating acknowledgment relay $R_1$(ACK) as previously described. Accordingly, this relay is operated and locked to ground by way of the break contacts of relay TO. Thus, with an acknowledgment relay operated in store 210, the station will send the corresponding code when it goes to the SEND mode, as previously described.

Assuming that the received code is an acknowledgment code, an output of relay tree 92 such as output lead 100 is enabled. Thus, the operation of relay PM grounds lead 100. This output is passed by way of diode 102 to lead 104. Energization of lead 104 pulses the SET input of flip-flop 117. This opens the lock path of action relay $R_1$ to release the relay, as previously described.

Preferably, the pulsing of lead 100 also passes a pulse through diode 106 to lead 107 and thence to console 96. This could provide, for example, a momentary lighting of a lamp or other indication to designate that the acknowledgment of the action code has been received.

Although a specific embodiment of this invention has been shown and described, it will be understood that various modifications may be made without departing from the spirit of this invention and within the scope of the appended claims.

What is claimed is:

1. A system wherein action data words and acknowledgment data words are transmitted between stations, each action designating a source external to said system and each acknowledgment word corresponding to an action word and designating the reception of the action word from another station, each of said stations having a store which includes memory elements and means responsive to an active external source for storing in a memory element a designation of the active source, said stations further including scanning means operative during a discrete transmission interval for scanning all of said memory elements and transmitting means for transmitting the words corresponding to the designations in the scanned memory elements, characterized in that said store further includes means responsive to the reception of each incoming action word for storing in a memory element a designation of the acknowledgment word corresponding to the incoming action word whereby the transmitting means sends both the action words and the acknowledgment words during the same discrete interval.

2. A system wherein action words and discrete acknowledgment words are transmitted between stations, each action word designating a source external to said system and each acknowledgment word corresponding to an action word and designating the reception of the action word from another station, each of said stations having a store which includes memory elements, each of said elements dedicated to an action word, means responsive to an active external source for enabling the memory element dedicated to the action word corresponding to the active source, scanning means operative during a transmission interval for scanning all of the memory elements and transmitting means for transmitting the words corresponding to each enabled memory element scanned, characterized in that said store includes additional memory elements, each of said additional elements dedicated to an acknowledgment word and means responsive to the reception of each incoming action word for enabling the memory element dedicated to the acknowledgment word corresponding to the incoming action word.

3. A system, in accordance with claim 2, wherein each of said stations further includes means operative when each acknowledgment word is transmitted for disabling the corresponding memory element and means responsive to the reception of each acknowledgment word for disabling the memory element dedicated to the corresponding action word.

4. A system, in accordance with claim 3, wherein said means responsive to the reception of each acknowledgment word includes signal mutilation detection means for precluding the operation of said means responsive to the reception of each acknowledgment word when a mutilated acknowledgment word is received.

5. A system, in accordance with claim 2, wherein said transmitting means includes means for generating redundant error check bits for each of the transmitted words whereby both the action and the acknowledgment words are protected code words.

References Cited

UNITED STATES PATENTS

| | | | |
|---|---|---|---|
| 2,424,571 | 7/1947 | Lang. | |
| 2,616,959 | 11/1952 | Breese et al. | |
| 3,001,018 | 9/1961 | Van Dalen. | |
| 3,454,936 | 7/1969 | Bridge et al. | 340—172.5 |

PAUL J. HENON, Primary Examiner

M. B. CHAPNICK, Assistant Examiner